UNITED STATES PATENT OFFICE.

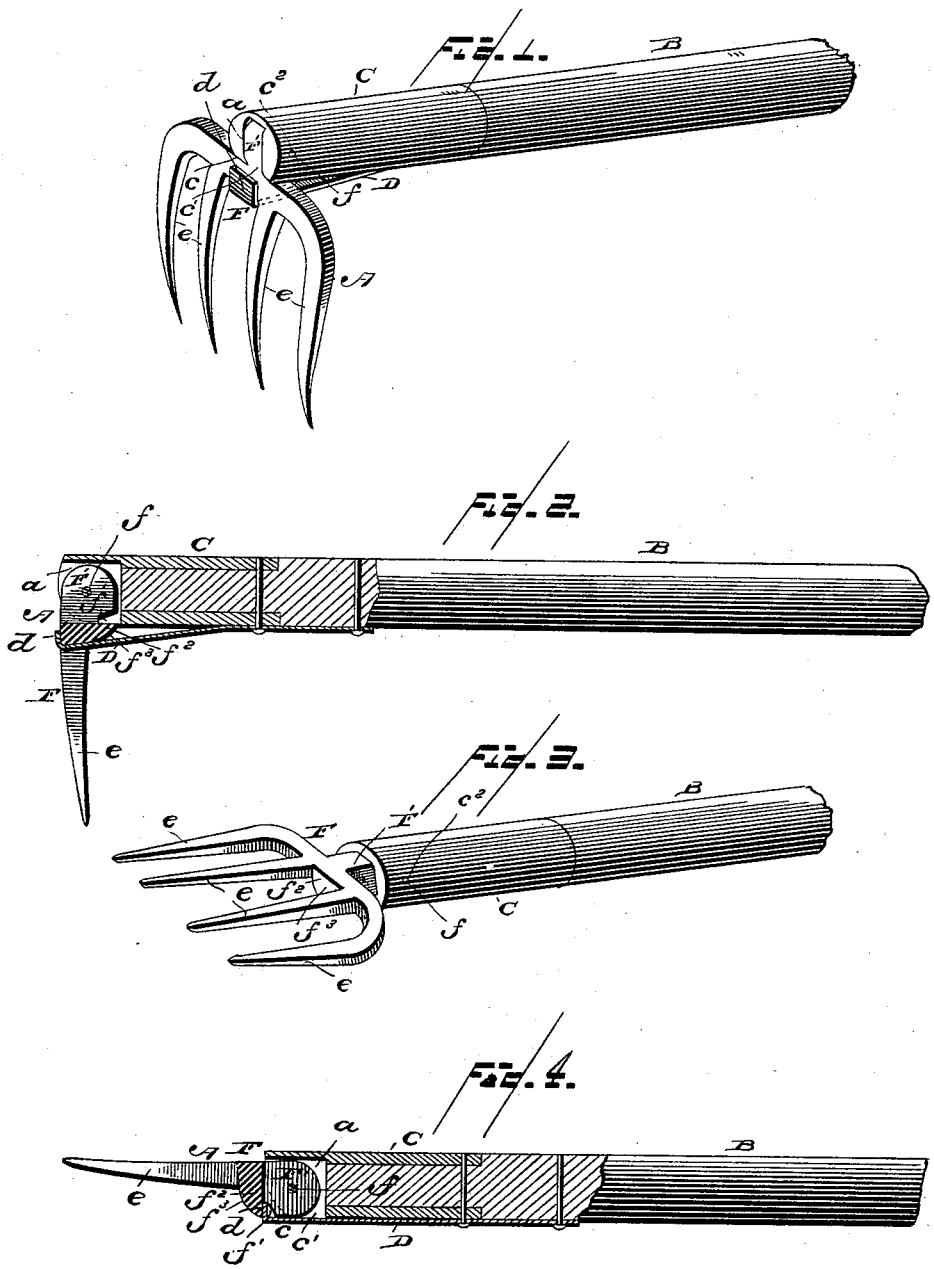

ALBERT J. WILCOX AND ELIZA B. WILCOX, OF MAPLE RAPIDS, MICHIGAN.

COMBINED PITCHFORK AND RAKE.

SPECIFICATION forming part of Letters Patent No. 339,830, dated April 13, 1886.

Application filed January 4, 1886. Serial No. 187,568. (No model.)

*To all whom it may concern:*

Be it known that we, ALBERT J. WILCOX and ELIZA B. WILCOX, citizens of the United States, residing at Maple Rapids, in the county of Clinton and State of Michigan, have invented a new and useful Improvement in a Combined Pitchfork and Rake, of which the following is a specification, reference being had to the accompanying drawings.

My invention relates to a combined rake and pitchfork, the object being to construct a device which will effectually and in a simple manner combine these two implements in one, so that should it be found desirable to employ either a rake or a pitchfork they can be readily and quickly provided by merely adjusting the parts.

With this object in view the invention consists in the improved construction, combination, and arrangement of the various parts which compose our device, as will be fully explained hereinafter, and specifically pointed out in the claims.

In the accompanying drawings, Figure 1 is a perspective view showing the device adjusted to form a rake. Fig. 2 is a longitudinal sectional view thereof. Fig. 3 is a perspective view showing the device as adjusted to form a pitchfork, and Fig. 4 is a longitudinal section thereof.

Referring to the drawings, in which like letters of reference indicate similar parts in all of the figures, A represents our improved rake and pitchfork, which is provided with a handle, B, upon the front or forward end of which is secured a hollow ferrule, C. This ferrule is substantially cylindrical in form, the under side being flattened lengthwise or longitudinally, as at $c$. The front end of the hollow ferrule forms a socket, as at $a$, the side walls of which are perforated, as at $c^2$, said socket being rectangular in cross-section and cut out on one side at $c'$, for the purpose hereinafter explained.

Fastened on the under side of the handle, and resting over the flattened portion $c$ of the tubular ferrule, is a flat spring-catch, D, which extends forward and lies over the cut-out portion $c'$ of the said tubular ferrule, and has its forward end bent inwardly to provide an engaging nib, $d$.

F designates the head of our rake and pitchfork, which has its usual tines or prongs, $e$, made tapering toward their forward or lower ends, as shown. Projecting from the top of the head F, about the center thereof, is a lug, F', adapted to fit snugly in the socket $a$, formed in the top of the tubular ferrule C. Said lug has an opening or perforation provided therein, which aligns with the openings or perforations $c^2$ in the side walls of the socket, to allow the passage of the pivot-pin $f$, to pivot the head F, or in the ferrule. This lug is cut out on its under side, as at $f'$, to provide a projecting shoulder, $f^2$, the bent portion or nib $d$ of the spring D being adapted to fit in this cut-out portion $f'$ and bear against the projecting shoulder $f^2$, to hold the implement rigidly in its adjusted position as a pitchfork. This projecting shoulder is curved on its outer face, as at $f^3$, to allow the spring to ride over and have its bent portion or nib $d$ clasp tightly the front straight face, $f^4$, of the head F.

In Fig. 1 our device is shown as adjusted to form a rake, the spring D having its bent portion or nib engaging the front flat face of the head, as at $f^4$, thus holding the head from any movement.

In Fig. 3 our device is illustrated as in position for performing the function of a pitchfork, the spring D lying flat against the flattened portion on the inner side of the tubular ferrule, and having its forward inwardly-bent portion or nib fitting in the cut-out portion $f'$ on the lug F, and bearing against the projecting shoulder $f^2$, to hold the head rigidly in position as a pitchfork.

The operation of our invention will be readily understood from the foregoing description, taken in connection with the annexed drawings.

When it is desired to provide a rake, by merely lifting the spring D and drawing or swinging the head downwardly on its pivot-pin, the spring is caused to ride on the curved portion $f^3$ of the head and fasten its bent portion or nib on the front flat face of the head, as at $f^4$. When it is to be used as a pitchfork, by lifting the spring and throwing the head forward, the spring is caused to ride back on the curved portion $f^3$, and have its engaging nib fit in the cut-out portion $f'$ against the shoulder $f^2$, the head being supported in a horizontal position.

The advantages of our improvement are numerous.

We provide a device which perfectly combines two useful improvements in one, and which can be sold at the same price that would be charged for either of them.

We claim as our invention—

1. As an improvement in combined rakes and pitchforks, the combination, with the handle, of the head F, pivoted to the handle, and provided with a cut-out portion, $f'$, a shoulder, $f^2$, and a curved face, $f^3$, and the spring-catch D, having a projecting nib, $d$, which fits in the cut-out portion $f'$ and bears against the shoulder $f^2$ when the device is used as a pitchfork, and rides over the curved face, so as to engage against the flat opposite face of the head F, when employed as a rake, as and for the purpose set forth.

2. As an improvement in combined pitchforks and rakes, the combination, with the handle, of the head F, pivoted to the same and provided with a cut-out portion, $f'$, and the spring-catch D, having a projecting nib fitting in the cut-out portion $f'$ when the device is employed as a pitchfork, which nib rides over the head and catches against the flat face thereof opposite the cut-out portion $f'$ when employed as a rake, as set forth.

In testimony that we claim the foregoing as our own we have hereto affixed our signatures in presence of two witnesses.

ALBERT J. WILCOX.
ELIZA B. WILCOX.

Witnesses:
E. E. MOSS,
H. F. AUTEN.